(12) United States Patent
Sakoh et al.

(10) Patent No.: US 7,822,722 B2
(45) Date of Patent: Oct. 26, 2010

(54) PAGE TITLE DISPLAY METHOD

(75) Inventors: Noriyuki Sakoh, Kanagawa (JP); Takeshi Iwatsu, Kanagawa (JP); Junichi Aramaki, Chiba (JP)

(73) Assignee: Sony Corporation, Tokyo (JP)

( * ) Notice: Subject to any disclaimer, the term of this patent is extended or adjusted under 35 U.S.C. 154(b) by 650 days.

(21) Appl. No.: 10/571,774

(22) PCT Filed: Sep. 14, 2004

(86) PCT No.: PCT/JP2004/013721
§ 371 (c)(1),
(2), (4) Date: Mar. 15, 2006

(87) PCT Pub. No.: WO2005/031582
PCT Pub. Date: Apr. 7, 2005

(65) Prior Publication Data
US 2008/0235235 A1    Sep. 25, 2008

(30) Foreign Application Priority Data
Sep. 29, 2003  (JP) .............................. 2003-338919

(51) Int. Cl.
*G06F 3/00* (2006.01)
(52) U.S. Cl. ....................................................... 707/694
(58) Field of Classification Search ................. 715/254; 707/694
See application file for complete search history.

(56) References Cited

U.S. PATENT DOCUMENTS 6,430,624 B1 * 8/2002 Jamtgaard et al. ........... 709/246
6,526,424 B2 * 2/2003 Kanno et al. ................. 715/229
2001/0056418 A1 * 12/2001 Youn ............................. 707/3
2003/0177265 A1 * 9/2003 Page et al. .................. 709/245
2004/0139047 A1 * 7/2004 Rechsteiner et al. ........... 707/1

FOREIGN PATENT DOCUMENTS

JP    2002-7449    1/2002
JP    2003-36216   2/2003

OTHER PUBLICATIONS

Kojima, Kunio, "Ketai de Miru Web Page No. Tsukurikata", $1^{st}$ edition, Ascii Corp., p. 267, 2000.

* cited by examiner

*Primary Examiner*—Neveen Abel Jalil
*Assistant Examiner*—Kellye D Buckingham
(74) *Attorney, Agent, or Firm*—Oblon, Spivak, McClelland, Maier & Neustadt, L.L.P.

(57) ABSTRACT

A method of displaying a page title on a terminal apparatus, and associated terminal apparatus and page data transmission apparatus are provided. The method includes transmitting a request signal to request external page data relating to an external page, and receiving external page data corresponding to the request signal. The external page data includes first title information, second title information, and address information that each relate to the external page. The first title information, second title information, and address information of the external page data are stored in a storage section of the terminal apparatus. The first title information includes a plurality of characters that are not limited in number, and the second title information includes a plurality of characters that are limited in number. The stored second title information is displayed on a display section of the terminal apparatus.

15 Claims, 11 Drawing Sheets

PAGE TITLE DISPLAY METHOD

TECHNICAL FIELD

The present invention relates to a page title display method, and is preferably applied to a case in which a Web page is displayed based on a source supplied from a certain server, for example.

BACKGROUND ART

In late years, many terminal devices such as personal computers have browser programs installed. The terminal devices therefore can display Web pages on a display section based on sources supplied via the Internet from various kinds of servers. The sources are description written in such languages as HTML (Hyper Text Markup Language) and XML (eXtensible Markup Language).

In general, the terminal devices having those browser programs installed also have a bookmark function. The terminal device therefore can memorize (i.e., bookmark) Web page's address. A user of the terminal device bookmarks addresses of Web pages that he/she often browses. Therefore the user does not have to input any URLs (Uniform Resource Locators) when he/she wants to access the Web pages (see Patent Document 1, for example).

Patent Document 1: Japanese Patent Publication No. H11-73432

In late years, as the box of the terminal device gets smaller, so does its display section.

When the terminal device displays on the display section a list of titles of the bookmarked Web pages as well as a Web page, the device may fail to display all of the titles on the display section since the number of characters of the title is very long.

In this case, the user can see only a part of the title, and therefore has difficulty in recognizing what the corresponding Web page is about. Accordingly, there is a problem that the terminal device is often difficult to use.

DISCLOSURE OF THE INVENTION

The present invention has been made in view of the above points and is intended to provide a page title display method that can tremendously improve its usability.

To solve the above problem, a page title display method in accordance with the present invention comprising: a first step of transmitting a request signal to request external page data; a second step of receiving the page data corresponding to the request signal; a third step of storing first title information, second title information in which the number of characters is limited, and address information of the page data when an operation to store the address information is performed, the page data including the address information, the first title information, and the second title information; and a fourth step of displaying the stored second title information on a display section.

According to this method, apparatus displays on the display section the title information in which the number of characters is limited. This allows a user to check all of the title information.

According to the present invention, apparatus displays on the display section the title information in which the number of characters is limited. This allows a user to check all of the title information. Thus, this page title display method can tremendously improve the usability.

BEST MODE FOR CARRYING OUT THE INVENTION

An embodiment of the present invention will be described in detail with reference to the accompanying drawings.

(1-1) Overall Configuration of Content Sales System

Figure 1:
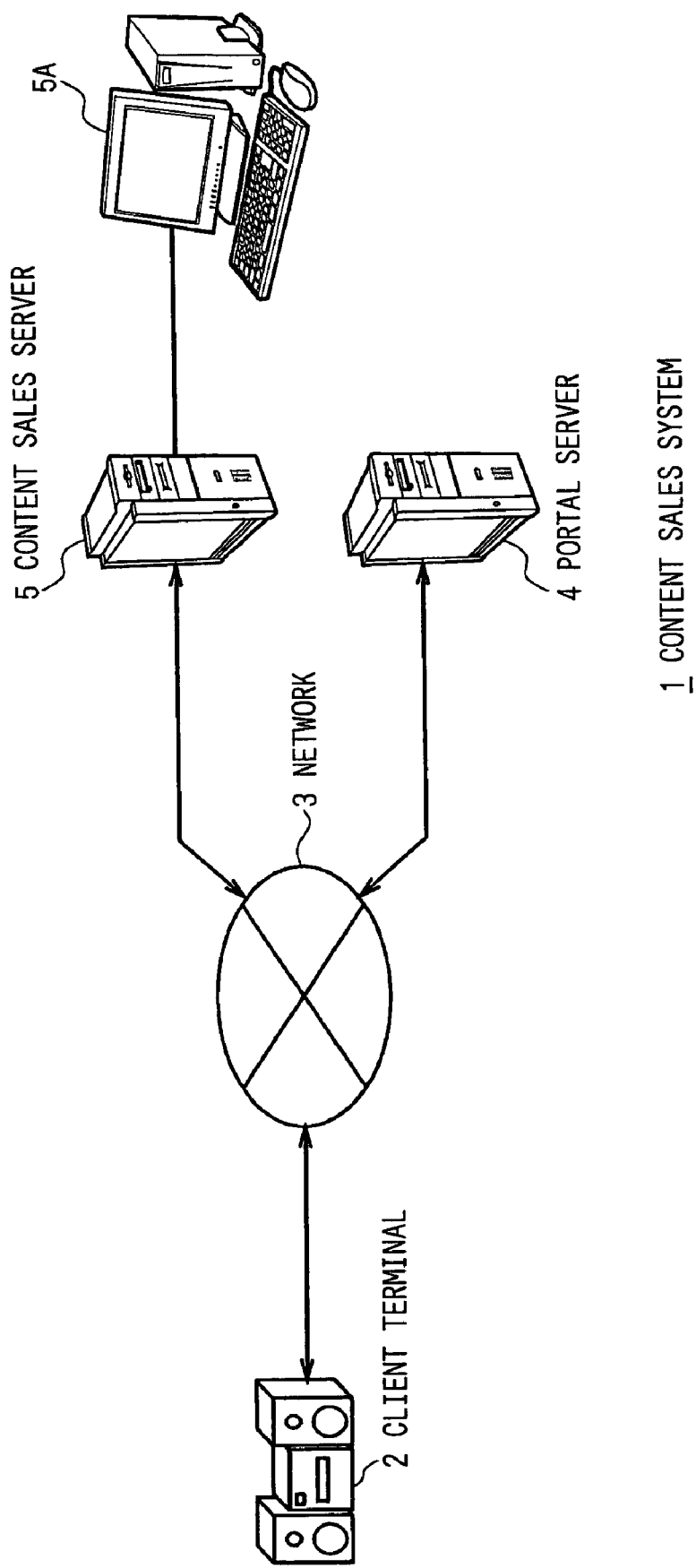
FIG. 1 is a schematic diagram showing the overall configuration of a content sales system in accordance with an embodiment of the present invention.

Referring to FIG. 1, the reference numeral 1 denotes a content sales system. A user's client terminal 2 (this user is allowed to join this content sales system 1) connects via a network 3 to a portal server 4, a content sales server 5 and the like. The portal server 4 performs processes to manage the client terminal 2. The content sales server 5 performs processes to sell CD/DVD that records various kinds of content.

In the present embodiment, an authoring device 5A is connected to the content sales server 5. This authoring device 5A is for example equivalent to a personal computer. A server-side (the content sales server 5 side) homepage producer can make sources of various kinds of pages such as a page of "A Company—the Page for Selling CDs" and upload these sources to the content sales server 5 using the authoring device 5A.

Figure 2:
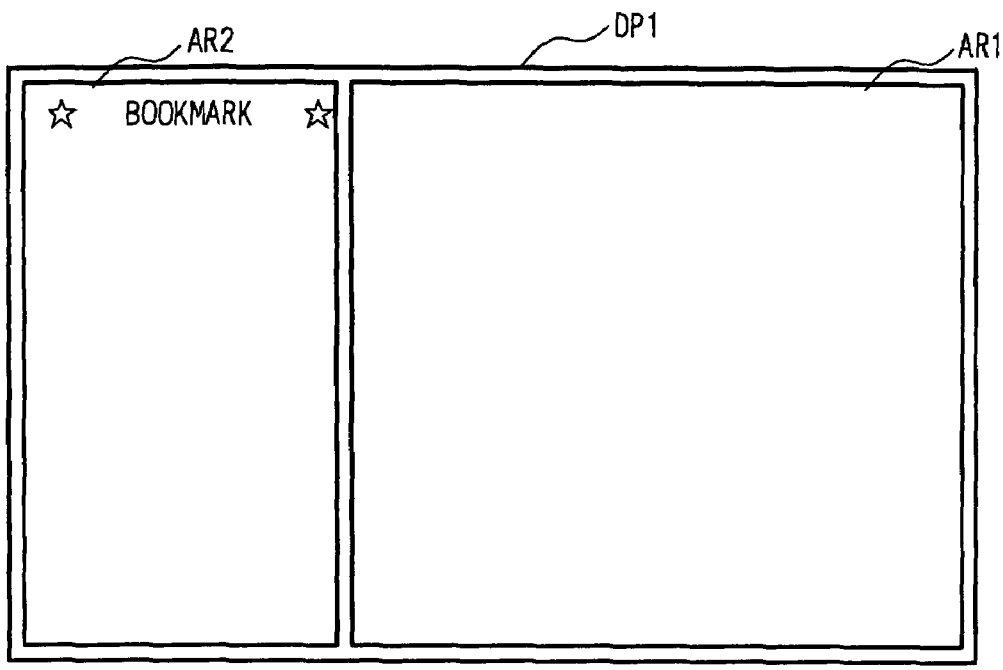
FIG. 2 is a schematic diagram showing a basic screen (1).

The client terminal 2 for example displays on a display section a basic screen DP1 as shown in FIG. 2 when the user switches on the client terminal 2. This basic screen DP1 includes: a page display area AR1 where various kinds of pages are displayed based on sources written in such languages as XML (eXtensible Markup Language); and a bookmark display area AR2 where bookmarks registered by the user are displayed.

When the user performs top page display operation to display "Top Page" of this content sales system 1, the client terminal 2 for example transmits a request signal to the portal server 4 that stores the source of the "Top Page" to request the portal server 4 to transmit this source. The client terminal 2 also transmits previously-registered user's ID and password along with that request signal.

When receiving the request signal, the ID and the password, the portal server 4 performs a user authentication process using the ID and the password.

When the result of the user authentication process shows that the user of the client terminal 2 is legitimate, the portal server 4 generates authentication result information. This authentication result information shows the fact that the user is legitimate and the time when the server 4 completed this authentication (this time is also referred to as an "authentication completion time"). And then the portal server 4 transmits to the client terminal 2 the generated authentication result information and the source of the page "Top Page" that corresponds to the request signal received from the client terminal 2.

Figure 3:
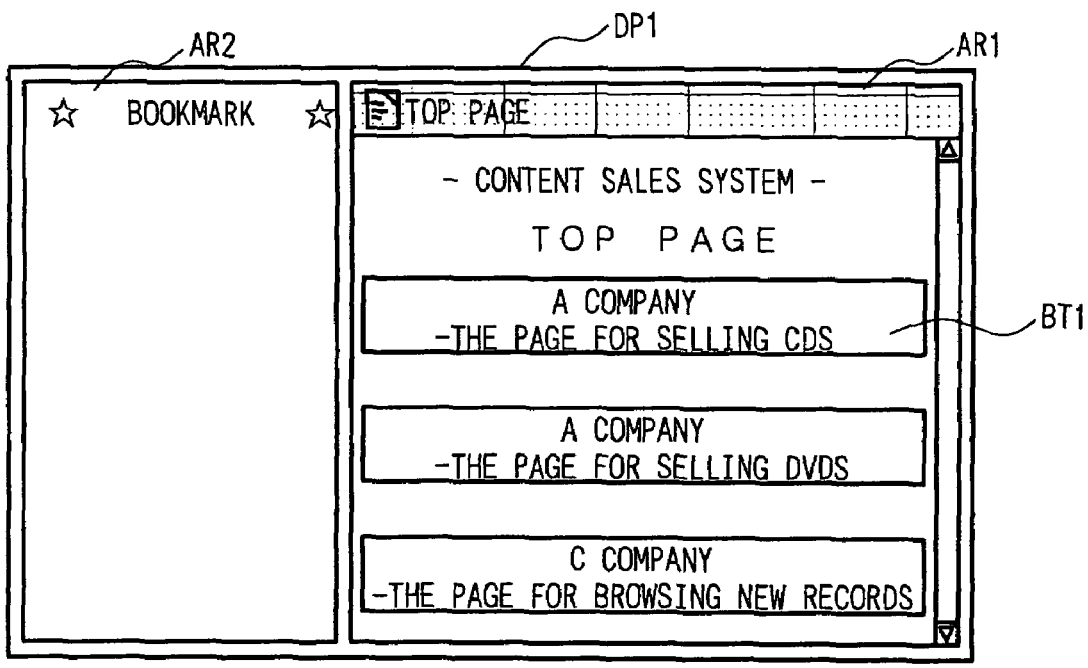
FIG. 3 is a schematic diagram showing a basic screen (2).

When receiving the authentication result information and the source of the page "Top Page" from the portal server 4, the client terminal 2 for example displays the page "Top Page" on the page display area AR1 based on this source as shown in FIG. 3. In this case, this page "Top Page" shows its title information "Top Page" at the top of the page display area AR1. And at the middle and bottom of the page display area AR1, this page "Top Page" shows a plurality of buttons such as a button BT1 linked to the page "A Company—the Page for Selling CDs" and buttons linked to other pages.

For example, when a user selects the button BT1 on the page "Top Page", the client terminal 2 obtains the URL of the page "A Company—the Page for Selling CDs" from the source of the page "Top Page". Based on the URL obtained, the client terminal 2 transmits a request signal to the A Company's content sales server 5 to request the A Company's content sales server 5 to send the source of the page "A Company—the Page for Selling CDs". The client terminal 2 also transmits the latest authentication result information obtained from the portal server 4 to the A Company's content sales server 5 along with that request signal.

The content sales server 5 receives the request signal and the authentication result information. And then based on the authentication completion time and the like shown in the authentication result information, the content sales server 5 checks whether or not the user of the client terminal 2 has been authenticated as a legitimate user recently (in the past one minute, for example). When the result of the check shows that this user has been authenticated as a legitimate user recently, the content sales server 5 transmits to the client terminal 2 the source of the page "A Company—the Page for Selling CDs" that corresponds to the request signal.

By the way, when the result of the check shows that this user has not been authenticated as a legitimate user recently, the content sales server 5 does not transmit the source of the page "A Company—the Page for Selling CDs" to the client terminal 2.

Figure 4:
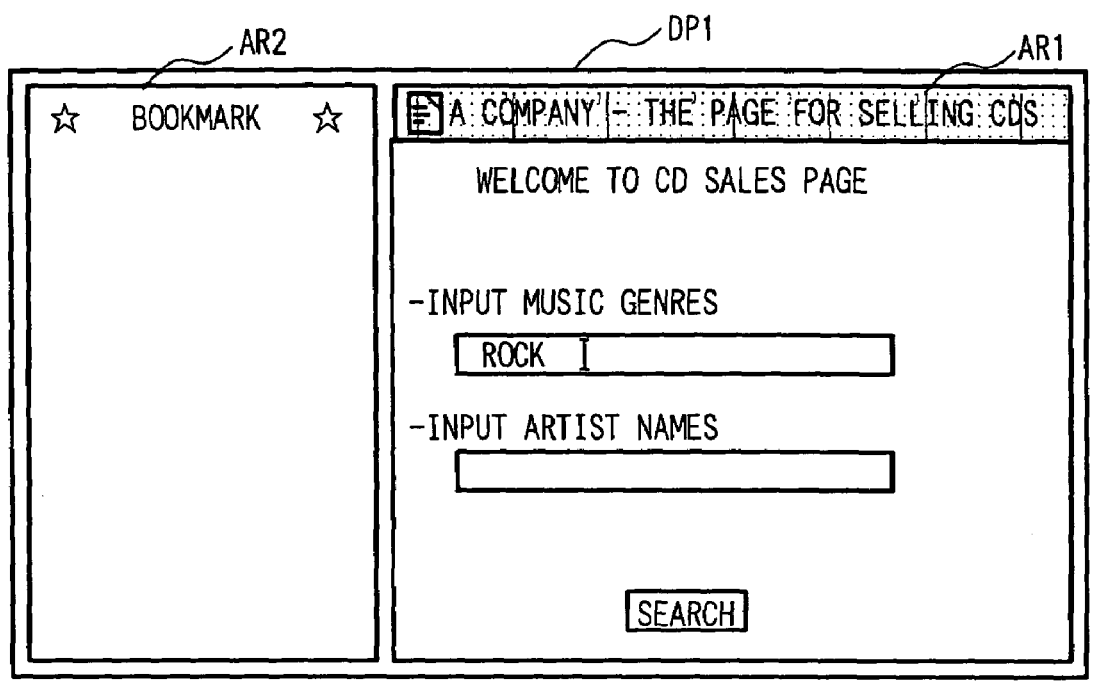
FIG. 4 is a schematic diagram showing a basic screen (3).

Based on the source of the page "A Company—the Page for Selling CDs" received from the content sales server 5, the client terminal 2 displays the page "A Company—the Page for Selling CDs" on the page display area AR1 for example as shown in FIG. 4. This allows the user of the client terminal 2 to use a CD sales service provided by the content sales server 5 through the page "A Company—the Page for Selling CDs".

(1-2) Configuration of Portal Server

Figure 5:
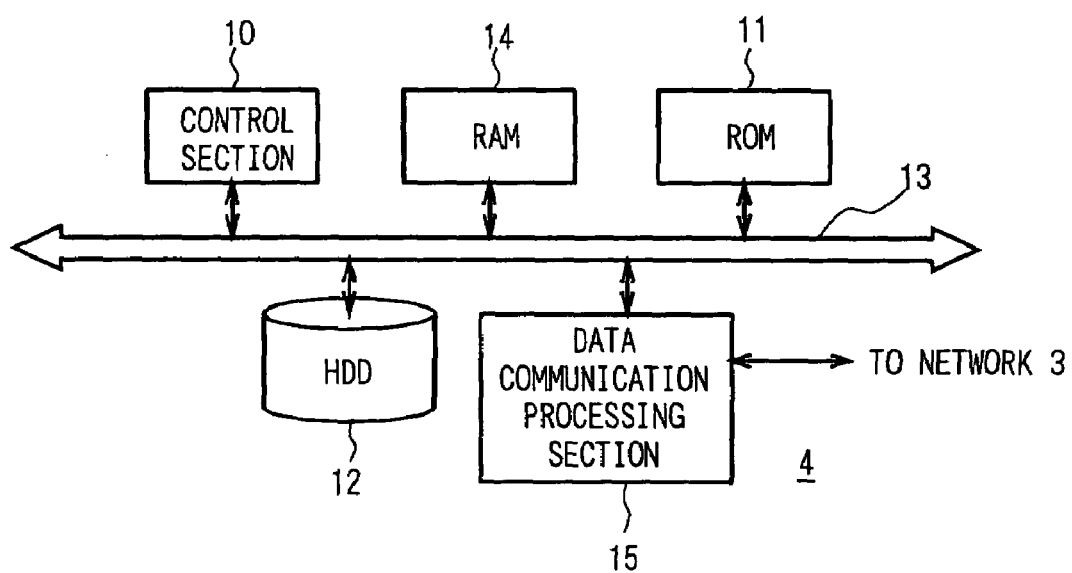
FIG. 5 is a block diagram showing the circuit configuration of a portal server.

Referring to FIG. 5, the portal server 4 includes a control section 10. The control section 10 is equivalent to CPU (Central Processing Unit). The control section 10 loads various programs (such as basic programs) stored in a ROM 11 or a hard disk drive 12 into a RAM 14 via a bus 13 to execute these programs, and performs various processes such as the user authentication process. The hard disk drive 12 has stored IDs of each user who is allowed to join this content sales system 1 and corresponding passwords.

For example, when receiving a user ID and password from the client terminal 2 via the network 3 and the data communication processing section 15, the control section 10 of the portal server 4 starts the user authentication process. In this user authentication process, the control section 10 of the portal server 4 checks whether or not the hard disk drive 12 has stored the same user ID and password.

When the control section 10 of the portal server 4 recognizes that the hard disk drive 12 has stored the same user ID and password, the control section 10 determines that this user is legitimate. The control section 10 of the portal server 4 then transmits to the client terminal 2 the authentication result information showing the fact that the user is legitimate and the authentication completion time. By contrast, when the control section 10 of the portal server 4 recognizes that the hard disk drive 12 has not stored the same user ID and password, the control section 10 determines that this user is not legitimate. In this case, the control section 10 of the portal server 4 transmits to the client terminal 2 the authentication result information showing the fact that this user is not legitimate.

(1-3) Configuration of Content Sales Server

Figure 6:
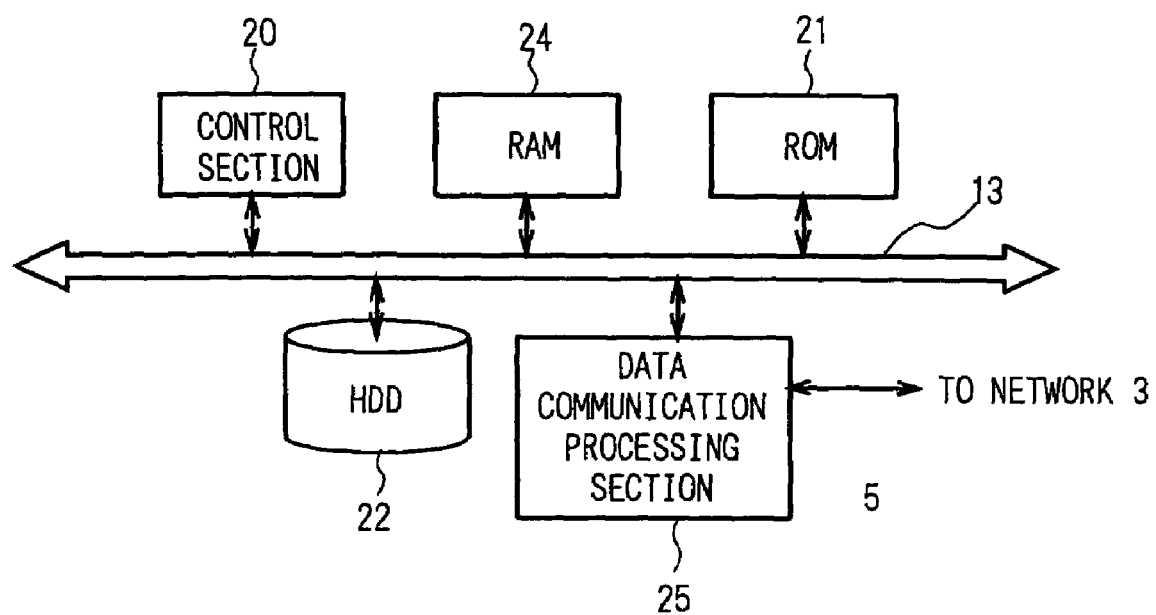
FIG. 6 is a block diagram showing the circuit configuration of a content sales server.

Referring to FIG. 6, the content sales server 5 includes a control section 20 that is equivalent to a CPU. The control section 20 loads various programs (such as basic programs) stored in a ROM 21 or a hard disk drive 22 into a RAM 24 via a bus 23 to execute these programs, and performs various processes such as CD sales process for selling CDs to users. The hard disk drive 22 has stored various page sources such as the source of the page "A Company—the Page for Selling CDs".

When receiving from the client terminal 2 via the network 3 and a data communication processing section 25 the authentication result information and the request signal that requests the source of the page "A Company—the Page for Selling CDs", the control section 20 of the content sales server 5 first checks whether or not the user of the client terminal 2 has been authenticated as a legitimate user recently (in the past one minute, for example) based on the authentication completion time and the like shown in the authentication result information.

In this embodiment, the hard disk drive 22 of the content sales server 5 has stored definition information that defines that the authentication result information issued within the last one minute is valid. When the control section 20 of the content sales server 5 determines that the authentication result information received from the client terminal 2 is valid in accordance with the definition information, the control section 20 decides that the user of the client terminal 2 has been authenticated as a legitimate user recently. By the way, the portal server 4 may produce the authentication result information including a period of validity (expiration date information). In this case, the control section 20 of the content sales server 5 uses the expiration date information of the authentication result information to determine whether or not this authentication result information is valid.

When the control section 20 of the content sales server 5 decides that the user of the client terminal 2 has been authenticated as a legitimate user recently, the control section 20 reads out from the hard disk drive 22 the source of the page "A Company—the Page for Selling CDs" that corresponds to the request signal. And then the control section 20 transmits this source to the client terminal 2.

(1-4) Configuration of Client Terminal

(1-4-1) Circuit Configuration

Figure 7:
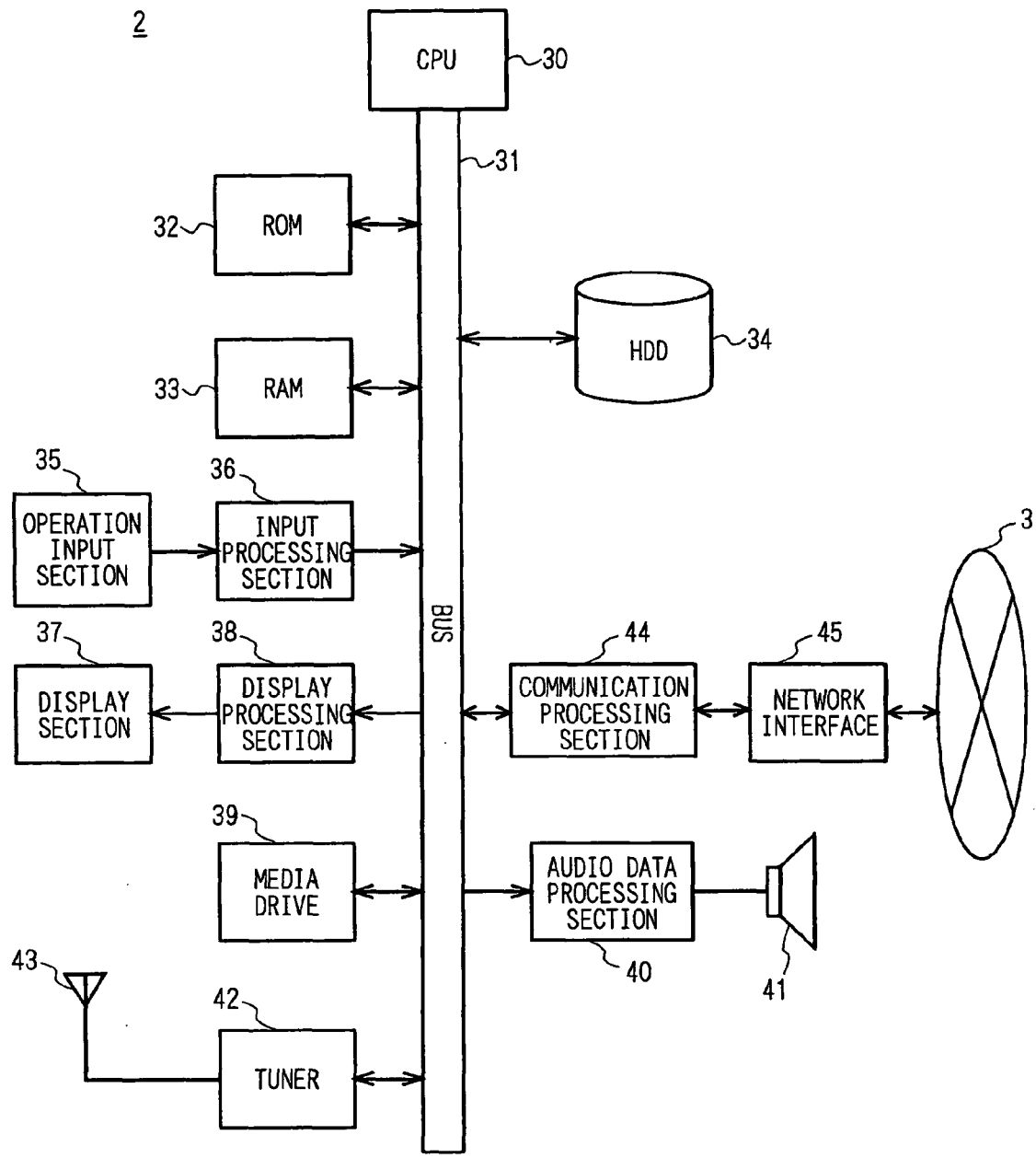
FIG. 7 is a block diagram showing the circuit configuration of a client terminal.

As shown in FIG. 7, the client terminal 2 includes a CPU 30. The CPU 30 reads out basic programs (such as OS (Operating System) program) and various application programs from a ROM 32 via a bus 31, and loads them into a RAM 33 to perform various processes. For example the CPU 30 performs: processes to take overall control of the terminal 2; arithmetic processes; communication processes through the network 3; processes to control user's Input/Output operation; processes to play back content media; processes to write content data downloaded from radio stations on a HDD (hard disk drive) 34; and processes to manage these content data.

When a user operates operation keys or buttons disposed on a body of the client terminal 2 or its remote controller (not shown), an operation input section 35 generates input information based on the operation and transmits it to an input processing section 36. The input processing section 36 performs a prescribed process for the input information to generate an operation command, and transmit the command to the CPU 30. In response to the command, the CPU 30 performs processes.

A display section 37 is for example equivalent to a liquid crystal display. The display section 37 is directly connected, or externally connected to the body of the client terminal 2. The display section 37 displays various kinds of information supplied from the display processing section 38. In the present embodiment, the display section 37 is for example a 5-inch display, which is smaller than that of the average television and personal computer display.

A media drive 39 is for example equivalent to a CD player or a memory player that can play back flash memories and MEMORY STICK (Registered Trademark of Sony Corporation). The media drive 39 supplies the resulting data to an audio data processing section 40. The audio data processing section 40 performs digital-to-analog conversion process for the supplied data, and output them from a 2 channel speaker 41.

When the CPU 30 obtains audio content data (music data) via the media drive 39, the CPU 30 can store them in the hard disk drive 34 as audio data files.

When the CPU 30 reads out a plurality of static images from MEMORY STICK (Registered Trademark of Sony Corporation) using the media drive 39, the CPU 30 can display these images as a slide show on the display section 37 using the display processing section 38.

The CPU 30 may randomly reads out songs from the hard disk drive 34, and play back them in a user's desired order as if jukeboxes.

A tuner section 42 is for example equivalent to AM or FM tuners. The tuner section 42 under the control of the CPU 30 demodulates broadcast signals received by an antenna 43. The tuner section 42 then supplies the resulting dada (sounds of the broadcast) via the audio data processing section 40 to the speaker 41 which outputs sounds.

A communication processing section 44 under the control of the CPU 30 performs an encode process for data that it will transmit, and transmits it to external network-support devices via a network interface 45 and the network 3. When receiving data from external network-support devices via the network interface 45, the communication processing section 44 performs a decode process for the received data, and supplies it to the CPU 30.

(1-4-2) Directory Management

Figure 8:
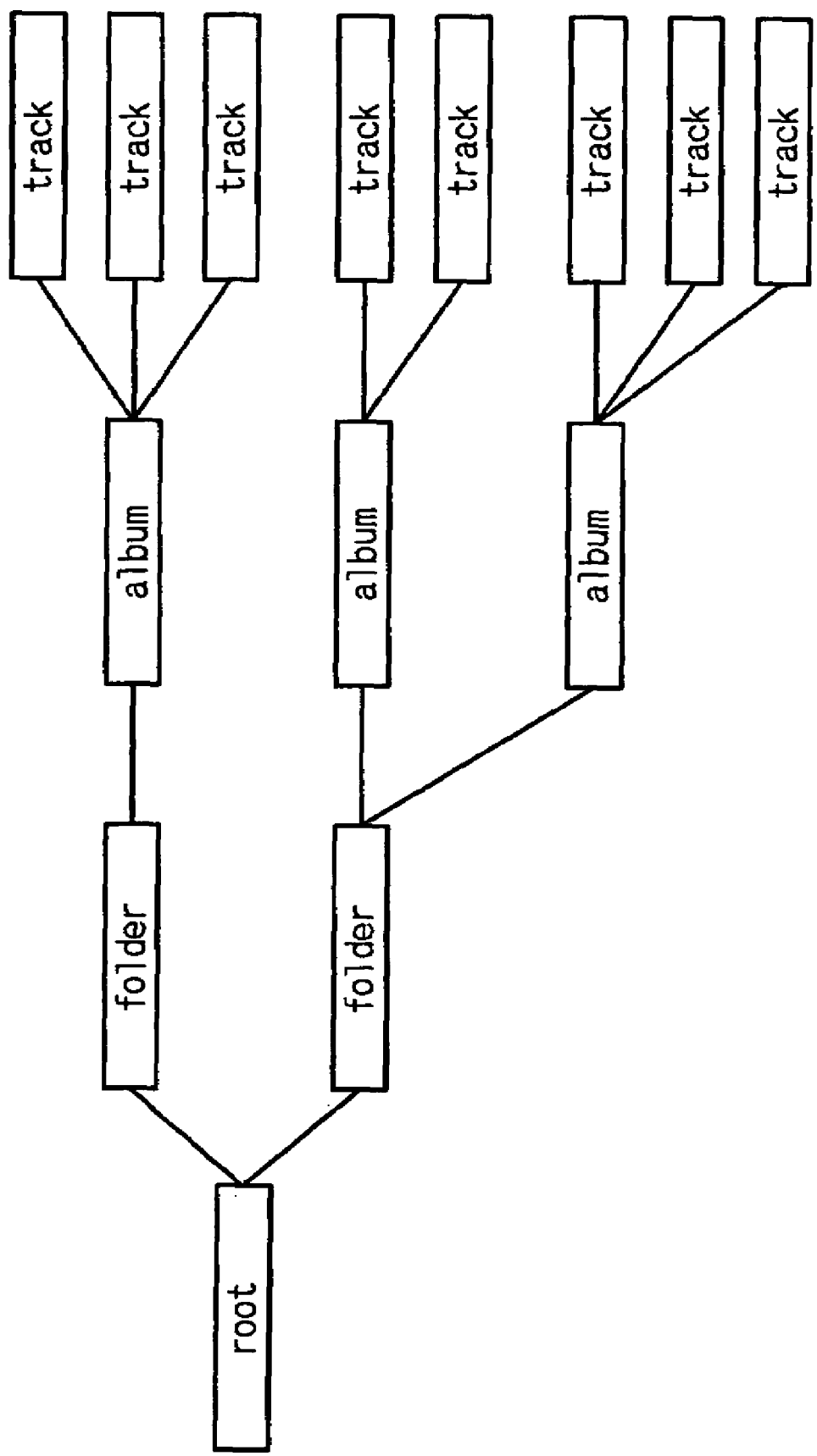
FIG. 8 is a schematic diagram showing the structure of folders.

The CPU 30 of the client terminal 2 manages content data stored in the hard disk drive 34 using a directory structure as shown in FIG. 8. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the hard disk drive 34.

(1-4-3) Configuration of Program Modules

Figure 9:
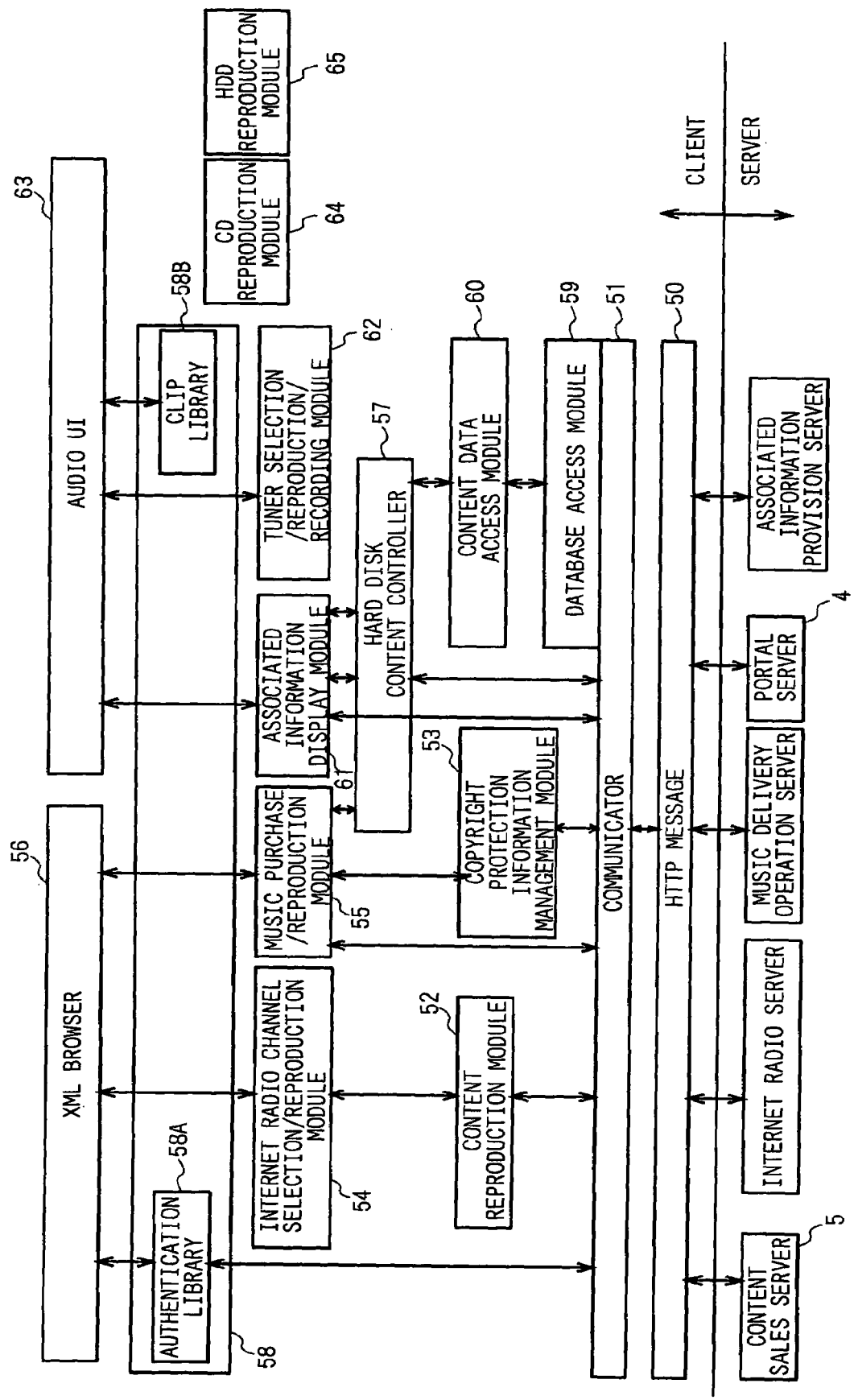
FIG. 9 is a schematic diagram showing program modules of the client terminal.

As shown in FIG. 9, the client terminal 2 runs program modules on the OS. The program modules interchanges signals, data, information and the like with various servers (such as the content sales server 5 for selling CDs, an internet radio server, a music delivery operation server, the portal server 4, an associated information provision server).

A HTTP (Hyper Text Transfer Protocol) message program 50 interchanges signals, data, information and the like with various kinds of servers (such as the content sales server 5 and the portal server 4) in HTTP communication. A communicator program 51 interchanges data with the HTTP message program 50.

A content reproduction module 52 and a copyright protection information management module 53 are disposed above the communicator program 51. The content reproduction module 52 interprets the codec of contents, and reproduces them. The copyright protection information management module 53 deals with information relating to copyright protection. An Internet radio channel selection/reproduction module 54 and a music purchase/reproduction module 55 are disposed above the content reproduction module 52 and the copyright protection information management module 53 respectively. The Internet radio channel selection/reproduction module 54 tunes in on radio stations on the Internet and plays back programs. The music purchase/reproduction module 55 controls the purchase of music and the reproduction of demo music.

A XML browser 56 is disposed above the Internet radio channel selection/reproduction module 54 and the music purchase/reproduction module 55. The XML browser 56 interprets sources written in XML, HTML or the like. Based on the result, the XML browser 56 displays a Web page (also referred to as a "page") on the display section 37.

For example, a user selects a piece of music using the XML browser 56. The music purchase/reproduction module 55 therefore performs purchasing processes for purchasing the piece of music. The purchased piece of music is supplied via a hard disk content controller 57 to the hard disk drive 34. The hard disk drive 34 stores this piece of music.

The communicator program 51 is connected to an authentication library 58A of a library 58. The authentication library 58A performs the user authentication process and the like with the portal server 4.

A database access module 59, a content data access module 60, and the hard disk content controller 57 are disposed above the communicator program 51.

The database access module 59 accesses various kinds of databases disposed in the hard disk drive 34. The content data access module 60 accesses content data stored in the hard disk drive 34. The hard disk content controller 57 manages content data stored in the hard disk drive 34.

An associated information display module 61 and a tuner selection/reproduction/recording module 62 are disposed above the hard disk content controller 57. The associated information display module 61 performs processes for displaying a title and artist name of music broadcast from radio stations. The tuner selection/reproduction/recording module 62 tunes in on radio stations. The tuner selection/reproduction/recording module 62 also records content data (music) received from a radio station on the hard disk drive 34.

For example, a user selects a radio station using an audio user interface 63 to receive music data from the radio station. The received music data is supplied via the content data access module 60 to the hard disk drive 34. The hard disk drive 34 then stores the music data.

The associated information display module 61 uses the tuner selection/reproduction/recording module 62 to receive information associated with the music currently broadcast by a radio station from the associated information provision server via the HTTP message program 50. For example, the associated information shows music titles and artist names. The associated information display module 61 then transmits the associated information via the audio user interface (UI) 63 to the display section 37. The display section 37 then displays the associated information.

The associated information, supplied via the audio user interface 63 and displayed on the display section 37, may be temporarily stored in a clip library 58B of the library 58. In response to user's instruction, the associated information is finally transferred via the database access module 59 to the hard disk drive 34. The hard disk drive 34 then stores the associated information.

The client terminal 2 also includes a CD reproduction module 64 for playing back CDs, and a HDD reproduction module 65 for playing back the hard disk drive 34. When reproducing data, the CD reproduction module 64 and the HDD reproduction module 65 supply them to the speaker 41 via the audio data processing section 40.

(2-1) Bookmark Registration

As described above, when receiving the source of the page "A Company—the Page for Selling CDs" from the content sales server 5, the CPU 30 of the client terminal 2 displays the page "A Company—the Page for Selling CDs" (FIG. 4) on the page display area AR1 based on the received source.

The source of the page "A Company—the Page for Selling CDs" is previously made by a server-side (the content sales server 5 side) homepage producer who used the authoring device 5A. This source includes description of "A Company—the Page for Selling CDs" as page title information. The page title information is displayed on the top of the page display area AR1. This source also includes description of "A Company's CD Sales Page" as bookmark title information. The bookmark title information is displayed on the bookmark area AR2. This source further includes service identification information that indicates that this page "A Company—the Page for Selling CDs" is published for providing CD sales services. In addition, this source also includes bookmark availability flag information that indicates whether or not this page can be bookmarked.

In the present embodiment, the number of characters of the page title information is not limited. Therefore, 29 characters of the page title information "A Company—the Page for Selling CDs" are described in this source. By contrast, the number of characters of the bookmark title information is limited to 21 characters. Therefore, 21 characters of the bookmark title information "A Company's CD Sales Page" are described in this source. This 21-character description "A Company's CD Sales Page" is an abbreviation of the 29-character description "A Company—the Page for Selling CDs".

Figure 10:
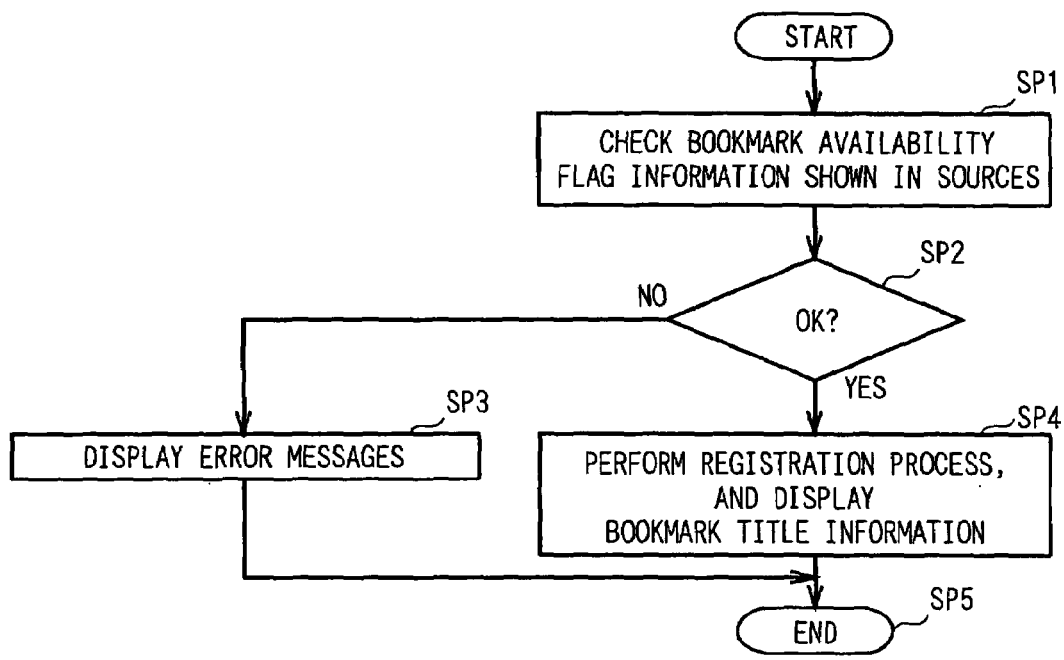
FIG. 10 is a flowchart illustrating a bookmark registration process.

For example, when the user performs a bookmark setting operation to bookmark the page "A Company—the Page for Selling CDs" being displayed on the page display area AR1, the CPU 30 of the client terminal 2 starts a bookmark registration process (FIG. 10) from step SP1.

At step SP1, the CPU 30 of the client terminal 2 checks the bookmark availability flag information shown in the source of the page "A Company—the Page for Selling CDs". In the present embodiment, for example, the bookmark availability flag information shows "OK" which indicates this page can be bookmarked, or "NO" which indicates this page cannot be bookmarked.

Then, the CPU 30 of the client terminal 2 proceeds to step SP2, and determines whether or not the bookmark availability flag information is "OK" based on the result of the check.

Negative result at step SP2 means that the bookmark availability flag information, described in the source of the page "A Company—the Page for Selling CDs", shows "NO", which is to say this page "A Company—the Page for Selling CDs" cannot be bookmarked. In this case, the CPU 30 of the client terminal 2 proceeds to step SP3 to display error messages on the display section 37 to inform that this page cannot be bookmarked. The CPU 30 of the client terminal 2 subsequently proceeds to step SP5 to end the bookmark registration process.

Accordingly, when the server-side (the content sales server 5 side) homepage producer wants users not to bookmark this page "A Company—the Page for Selling CDs", the producer sets "NO" as the bookmark availability flag information in the source of this page. As a result, this page "A Company—the Page for Selling CDs" cannot be bookmarked by the user of the client terminal 2. In this manner, the homepage producer sets "OK" or "NO" as the bookmark availability flag information in the source of pages. Therefore, users can bookmark only the pages that the homepage producer allowed.

Affirmative result at step SP2 means that the bookmark availability flag information, described in the source of the page "A Company—the Page for Selling CDs", shows "OK", which is to say this page "A Company—the Page for Selling CDs" can be bookmarked. In this case, the CPU 30 of the client terminal 2 proceeds to step SP4 to perform a registration process. The CPU 30 of the client terminal 2 then proceeds to step SP5 to end the bookmark registration process.

Figure 11:
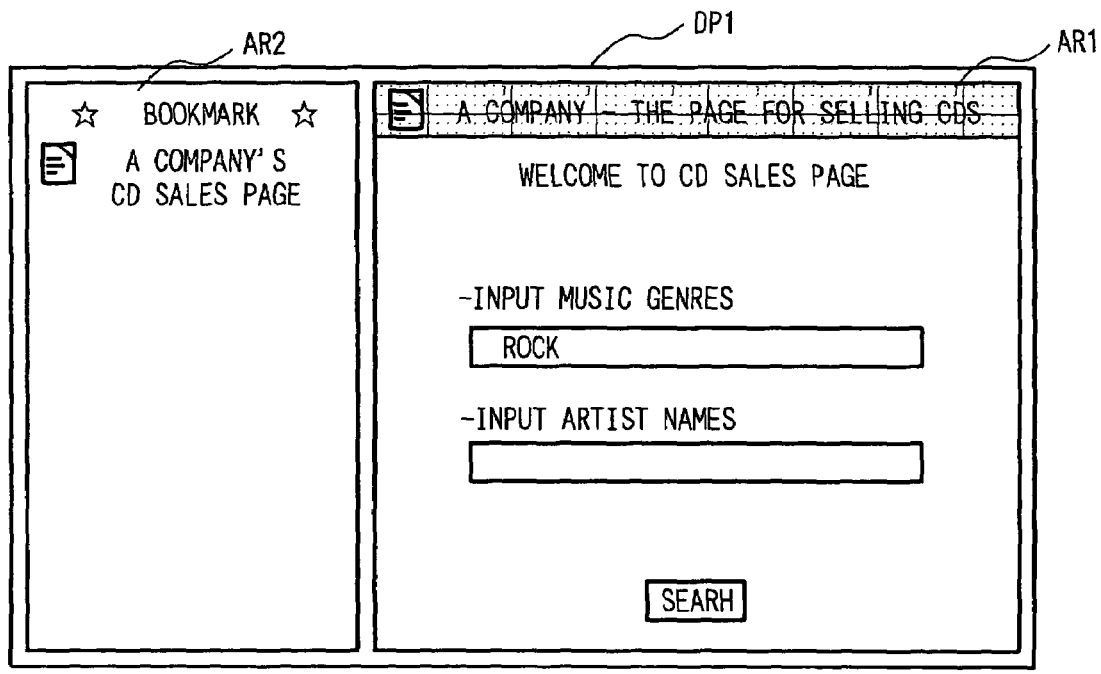
FIG. 11 is a schematic diagram showing a basic screen (4).

In this registration process, the CPU 30 of the client terminal 2 memorizes the bookmark title information "A Company's CD Sales Page" and service identification information described in the source of the page "A Company—the Page for Selling CDs", and the URL of this page, such that they are associated with each other. And then the CPU 30 of the client terminal 2 displays the bookmark title information "A Company's CD Sales Page" on the bookmark display area AR2 for example as shown in FIG. 11.

In the present embodiment, since the size of the display section 37 of the client terminal 2 is not large, the size of the bookmark display area AR2 is small accordingly. Therefore, the bookmark display area AR2 cannot display all of the page title information "A Company—the Page for Selling CDs" that consists of 29 characters. However, the number of characters of the bookmark title information is limited to 21 characters. Therefore, all of the bookmark title information "A Company's CD Sales Page", an abbreviation of the page title information "A Company—the Page for Selling CDs", can be displayed on the bookmark display area AR2.

(2-2) Bookmarks for Displaying the Page "A Company—the Page for Selling CDs"

In the present embodiment, for example, when the user selects the bookmark title information "A Company's CD Sales Page" (FIG. 11) being displayed on the bookmark display area AR2, the client terminal 2 performs a page display process to display the page "A Company—the Page for Selling CDs". With reference to sequence charts shown in FIG. 12 and FIG. 13, this page display process will be described below.

Figure 12:
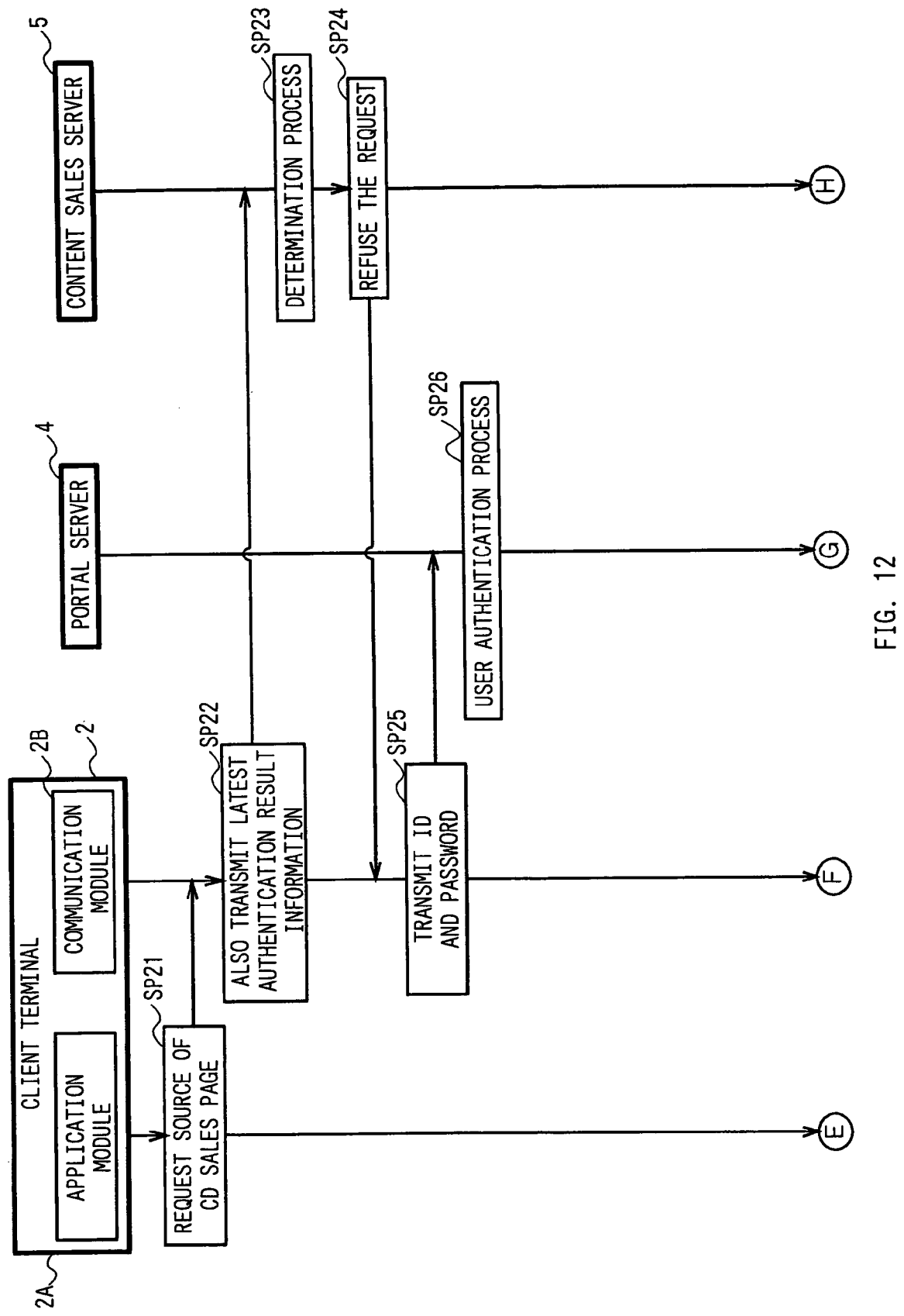
FIG. 12 is a sequence chart illustrating a page display process (1).
Figure 13:
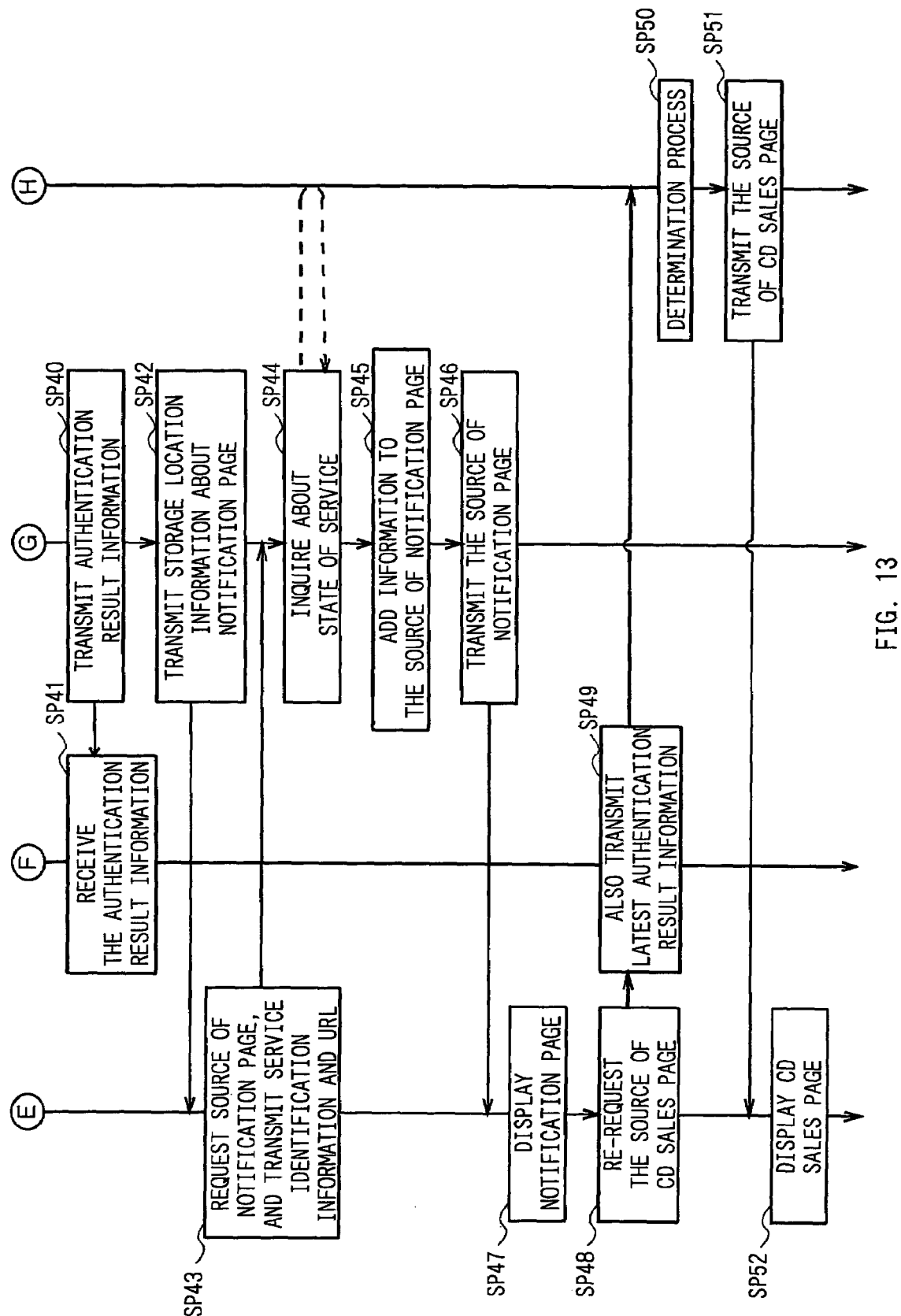
FIG. 13 is a sequence chart illustrating the page display process (2).

By the way, FIG. 12 and FIG. 13 show the client terminal 2 that includes an application module 2A and a communication module 2B. This application module 2A is equivalent to the above-noted XML browser 56 and the like, while the communication module 2B is equivalent to the above-noted communicator program 51 and the like. The application module 2A interchanges application-level commands and data with the portal server 4 and the content sales server 5 via the lower-level communication module 2B.

As a matter of convenience, processes will be described below as if the application module 2A and the communication module 2B perform them independently (Actually, the CPU 30 of the client terminal 2 controls the application module 2A and the communication module 2B to perform those processes).

When the user selects the bookmark title information "A Company's CD Sales Page" being displayed on the bookmark display area AR2, the application module 2A of the client terminal 2 proceeds to step SP21. At step SP21, based on the memorized URL associated with the bookmark title information "A Company's CD Sales Page", the application module 2A of the client terminal 2 generates a request signal that requests the source of the page "A Company—the Page for Selling CDs". Then, the application module 2A supplies this request signal to the communication module 2B, and proceeds to step SP22.

The communication module 2B of the client terminal 2 at step SP22 transmits the request signal supplied from the application module 2A to the content sales server 5 that has stored the source of the page "A Company—the Page for Selling CDs", along with the authentication result information acquired from the portal server 4. In this case, this authentication result information for example was acquired one hour ago.

When receiving the request signal and the authentication result information from the client terminal 2, the control section 20 of the content sales server 5 proceeds to step SP23. At step SP23, the control section 20 of the content sales server 5 checks the authentication completion time (indicating about one hour ago, for example) shown in the authentication result information to determine whether or not the user of the client terminal 2 has been authenticated as a legitimate user recently (within the last one minute, for example). When the result shows that the user of the client terminal 2 has not been authenticated as a legitimate user recently, the control section 20 of the content sales server 5 proceeds to step SP24 to generate a request refusal signal to refuse the request of the client terminal 2. Then, the control section 20 transmits the request refusal signal to the client terminal 2.

When receiving the request refusal signal from the content sales server 5, the communication module 2B of the client terminal 2 recognizes that the content sales server 5 has refused the request. In this case, the communication module 2B of the client terminal 2 proceeds to step SP25, and transmits the user's ID and password to the portal server 4.

When receiving the user's ID and password from the client terminal 2, the control section 10 of the portal server 4 proceeds to step SP26. At step SP26, the control section 10 of the portal server 4 performs the user authentication process based on the user's ID and password. When the control section 10 of the portal server 4 authenticates the user as a legitimate user, it generates the authentication result information showing the fact that this user is legitimate and a new authentication completion time. The control section 10 of the portal server 4 subsequently checks a certain area of the hard disk drive 12 to confirm whether or not a source of a page "Notification Page" is present.

This page "Notification Page" is generated by operators who operate this content provision system. This page for example shows maintenance information (indicating that the content sales server 5 will be going down for maintenance, for example) and the like.

When the control section 10 of the portal server 4 for example detects the source of the page "Notification Page" in the area of the hard disk drive 12, it proceeds to step SP40 (FIG. 13). At step SP40, the control section 10 of the portal server 4 transmits the generated authentication result information to the client terminal 2. The communication module 2B of the client terminal 2 receives this authentication result information at step SP41. After that, the control section 10 of the portal server 4 at step SP42 transmits to the client terminal 2 the storage location information that indicates the area where the page "Notification Page" exists.

When receiving the storage location information from the portal server 4 via the communication module 2B, the application module 2A of the client terminal 2 proceeds to step SP43. At step SP43, based on the storage location information, the application module 2A of the client terminal 2 generates a notification page request signal that requests the portal server 4 to send the source of the page "Notification Page". The application module 2A of the client terminal 2 then transmits the notification page request signal to the portal server 4 via the communication module 2B.

At this time, the application module 2A also transmits to the portal server 4 the service identification information and URL of the page "A Company—the Page for Selling CDs" (This service identification information and URL were memorized by the client terminal 2 when it bookmarked this page). As described above, the service identification information indicates that this page "A Company—the Page for Selling CDs" exists for providing CD sales services.

When receiving from the client terminal 2 the notification page request signal, and the service identification information and URL of the page "A Company—the Page for Selling CDs", the control section 10 of the portal server 4 proceeds to step SP44. At step SP44, the control section 10 of the portal server 4 inquires of the content sales server 5 whether or not the content sales server 5's CD sales service specified by the service identification information is currently available.

Figure 14:
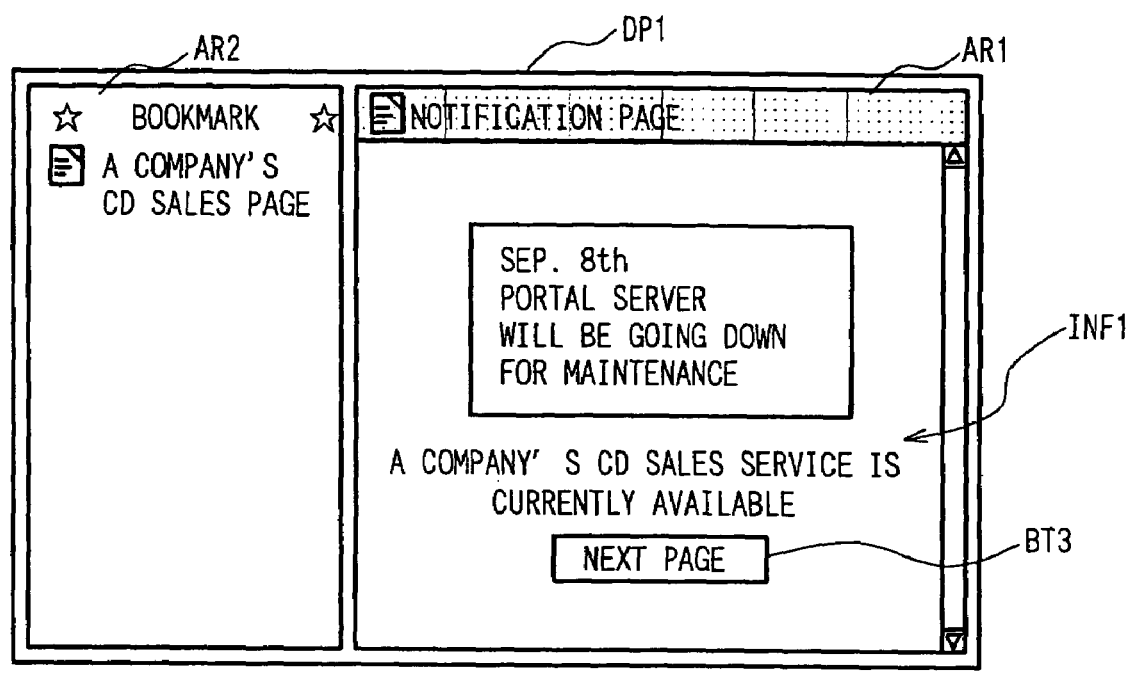
FIG. 14 is a schematic diagram showing a basic screen (5).

The control section 10 of the portal server 4 then proceeds to step SP45. At step SP45, the control section 10 of the portal server 4 adds the result of the inquiry to the source of the page "Notification Page". The control section 10 also adds the received URL of the page "A Company—the Page for Selling CDs" to this source of the page "Notification Page". With this new source, the page "Notification Page" can be displayed as shown in FIG. 14.

The control section 10 of the portal server 4 subsequently proceeds to step SP46, and transmits the new source of the page "Notification Page" to the client terminal 2 in response to the received notification page request signal.

When receiving the source of the page "Notification Page" via the communication module 2B, the application module 2A of the client terminal 2 at step SP47 displays the page "Notification Page" (FIG. 14) based on this source.

This page "Notification Page" includes the maintenance information about the portal server 4. This page "Notification Page" also includes current state information INF1 that shows the current state of CD sales service (The information of the current state of CD sales service is obtained by the portal server 4 that inquired of the content sales server 5 by using the service identification information received from the client terminal 2). The current state information INF1 for example shows that the CD sales service of the content sales server 5 is currently available, or that the CD sales service of the content sales server 5 is currently unavailable.

In this manner, the client terminal 2 can inform the user about the current state of the CD sales service through the page "Notification Page", before displaying the page "A Company—the Page for Selling CDs" for this CD sales service.

In addition, this page "Notification Page" includes a button BT3 that is linked to the URL of the page "A Company—the Page for Selling CDs". For example, when the user selects this button BT3, the application module 2A of the client terminal 2 proceeds to step SP48 and utilizes this URL to generate a request signal that requests the source of the page "A Company—the Page for Selling CDs". And then the application module 2A of the client terminal 2 supplies this request signal to the communication module 2B.

The communication module 2B at step SP49 transmits the latest authentication result information obtained at step SP41 to the content sales server 5, along with the request signal supplied.

When receiving the request signal and the authentication result information from the client terminal 2, the control section 20 of the content sales server 5 at step SP50 checks the authentication completion time and the like shown in the authentication result information to determine whether or not the user of the client terminal 2 has been authenticated as a legitimate user recently. When the result of the determination is that the user of the client terminal 2 has been authenticated as a legitimate user recently, the control section 20 of the content sales server 5 proceeds to step SP51. At step SP51, the control section 20 of the content sales server 5 accepts the request signal received from the client terminal 2, and then transmits the source of the page "A Company—the Page for Selling CDs" to the client terminal 2.

When receiving the source of the page "A Company—the Page for Selling CDs" from the content sales server 5 via the communication module 2B, the application module 2A of the client terminal 2 at step SP52 displays the page "A Company—the Page for Selling CDs" (FIG. 11) based on this source.

(3) Operation and Effects

In the above-noted configuration, the number of characters of the bookmark title information is limited to 21 characters in the source of the page "A Company—the Page for Selling CDs".

Thus, even if the size of the bookmark display area AR2 is not large, the client terminal 2 can display all of the bookmark title information "A Company's CD Sales Page" on the bookmark display area AR2, since this bookmark title information, an abbreviation of the page title information "A Company—the Page for Selling CDs", consists of 21 characters.

Therefore the user can understand what this page ("A Company's CD Sales Page") is about when selecting the bookmark of this page, since all of the bookmark title information of this page "A Company's CD Sales Page" is completely displayed on the bookmark display area AR2.

(4) Other Embodiments

In the above-noted embodiments, the number of characters of the bookmark title information (second title information) is limited to 21 characters. However, the present invention is not limited to this. The number of characters of the bookmark title information may vary depending on the size of the display section 37 of the client terminal 2.

In the above-noted embodiments, the bookmark availability flag information is flag information included in page data (the page data is equivalent to the source of the page "A Company—the Page for Selling CDs" for example). The bookmark availability flag information shows "OK" that indicates the corresponding page can be bookmarked, or "NO" that indicates the corresponding page cannot be bookmarked. However, the present invention is not limited to this. Other flags, marks or information can be described in sources as the bookmark availability flag information such that it indicates that the corresponding page can be bookmarked, or that the corresponding page cannot be bookmarked.

In the above-noted embodiments, URLs that indicate locations of page data are applied as address information of page data. However, the present invention is not limited to this. Other types of information can be applied as the address information if they are indicating locations of page data.

In the above-noted embodiments, based on the sources (also referred to as screen data), the client terminal 2 displays screens (Web pages) on the page display area AR1. The screen data are described in HTML, XML or the like. However, the present invention is not limited to this. Other languages and formats can be applied to the screen data.

In the above-noted embodiments, the client terminal 2 is applied as a terminal apparatus that displays pages (screens such as Web pages) based on page data (sources of Web pages). However, the present invention is not limited to this. Other information processing apparatus (such as mobile phones, Personal Digital Assistance (PDA), personal computers) also can be applied. In this case, the apparatus may be equipped with the circuit blocks (FIG. 7) and the program modules (FIG. 9).

In the above-noted embodiments, to perform the above-noted bookmark registration process and page display process, the client terminal 2 utilizes the preinstalled programs or software and controls circuit blocks. However, the present invention is not limited to this. The client terminal 2 can be equipped with hardware or circuit blocks that perform the bookmark registration process and the page display process. These circuit blocks enable the client terminal 2 to perform the above-noted bookmark registration process and page display process.

In the above-noted embodiments, to perform the above-noted page display process, the portal server 4 and the content sales server 5 utilize the preinstalled programs or software and control circuit blocks. However, the present invention is not limited to this. The portal server 4 and the content sales server 5 can be equipped with hardware or circuit blocks that perform the page display process. These circuit blocks enable the portal server 4 and the content sales server 5 to perform the above-noted page display process.

In the above-noted embodiments, the content sales server 5 is applied as page data transmission apparatus that transmits page data to external apparatus (the client terminal 2). However, the present invention is not limited to this. Other types of information processing apparatus can be applied if they can transmit the page data.

INDUSTRIAL APPLICABILITY

The present invention can be applied to a case in which apparatus bookmarks Web pages supplied from servers for example.

The invention claimed is:

1. A method of displaying a page title on a terminal apparatus, said method comprising:
   transmitting a first request signal from a network interface of the terminal apparatus to request external page data relating to an external page;
   receiving said external page data corresponding to said request signal at the network interface of the terminal apparatus, said external page data including:
      first title information,
      second title information that is distinct from said first title information at a time of receiving the second title information, and
      address information;
   storing said first title information, said second title information, and said address information of said external page data in a storage section of said terminal apparatus, said first title information including a plurality of characters that are not limited in number, and said second title information including a plurality of characters that are limited in number; and
   displaying simultaneously said stored first title information in a first display area and said stored second title information in a second display area that is smaller in size than the first display area, on a display section of the terminal apparatus,
   wherein the number of characters of said second title information corresponds to the size of the second display area of said display section.

2. The page title display method according to claim 1, wherein said storing includes prohibiting said address information from being stored in said storage section of said terminal apparatus when said external page data includes flag information that indicates a page bookmark action is not available for the external page.

3. The page title display method according to claim 1, wherein said storing includes storing service identification information that identifies a service corresponding to said external page data in the storage section of said terminal apparatus, said service identification information being included in said external page data along with said address information, and
   wherein said page title display method further comprises:
      transmitting a second request signal from the network interface of the terminal apparatus to request said external page data based on said stored address information;
      transmitting said service identification information stored in the storage section of said terminal apparatus from the network interface of the terminal apparatus to a prescribed apparatus when prescribed information is received in response to the second request signal transmitted by the network interface of the terminal apparatus;
      receiving additional information corresponding to said service identification information in the network interface of the terminal apparatus from said prescribed apparatus;
      displaying said additional information on said display section of the terminal apparatus;
      transmitting, after receiving additional information corresponding to said service identification information, a third request signal to re-request said page data based on said address information from the network interface of the terminal apparatus; and
      receiving said page data corresponding to said third request signal in the network interface of the terminal apparatus.

4. A terminal apparatus, comprising:
   first request signal transmission means for transmitting a first request signal to request external page data relating to an external page;
   first page data reception means for receiving said external page data corresponding to said request signal, said external page data including:
      first title information,
      second title information that is distinct from said first title information at a time of receiving the second title information, and
      address information;
   storage means for storing said first title information, said second title information, and said address information of said external page data, said first title information including a plurality of characters that are not limited in number, and said second title information including a plurality of characters that are limited in number; and
   display means for simultaneously displaying said stored first title information in a first display area and said stored second title information in a second display area that is smaller in size than the first display area,
   wherein the number of characters of said second title information corresponds to the size of the second display area of said display means.

5. The terminal apparatus according to claim 4, wherein said storage means does not store said address information when said external page data includes flag information that indicates a page bookmark action is not available for the external page.

6. The terminal apparatus according to claim 4,
   wherein said storage means further stores service identification information identifying a service corresponding to said external page data, said service identification information being included in said external page data along with said address information, and
   wherein said terminal apparatus further comprises:

second request signal transmission means for transmitting a second request signal to request said external page data based on said stored address information;

service identification information transmission means for transmitting said stored service identification information to a prescribed apparatus when prescribed information is received in response to said second request signal transmitted by said second request signal transmission means;

additional information reception means for receiving additional information corresponding to said service identification information from said prescribed apparatus; and second page data reception means for transmitting, after said display means displays said received additional information, a third request signal to re-request said external page data based on said address information, and for receiving said external page data corresponding to said third request signal.

7. A method of transmitting page data from a content apparatus, comprising:
receiving, in a data communication processing section of the content apparatus, a request signal from an external apparatus requesting page data that relates to a page stored in a storage portion of the content apparatus, said page data including:
first title information,
second title information that is distinct from said first title information at a time of receiving the second title information, and
address information, said first title information including a plurality of characters that are not limited in number, and said second title information including a plurality of characters that are limited in number;
transmitting, in response to said received request signal, to said external apparatus said page data; and
displaying simultaneously, on said external apparatus, said stored first title information in a first display area and said stored second title information in a second display area that is smaller in size than the first display area,
wherein the number of characters of said second title information corresponds to the size of the second display area of a display section of said external apparatus that displays said second title information based on said page data.

8. A page data transmission apparatus, comprising:
request signal reception means for receiving a request signal that requests a page from an external apparatus;
page data transmission means for transmitting, in response to said received request signal, to said external apparatus said page data, said page data including:
first title information, second title information that is distinct from said first title information at a time of receiving the second title information, and
address information, said first title information including a plurality of characters that are not limited in number, and said second title information including a plurality of characters that are limited in number; and display means for simultaneously displaying said first title information in a first display area and said second title information in a second display area that is smaller in size than the first display area,
wherein the number of characters of said second title information corresponds to the size of the second display area of a display section of said external apparatus that displays said second title information based on said page data.

9. The method of displaying the page title on the terminal apparatus according to claim 1, wherein the first title information is a page title of the external page, and the second title information is bookmark title information of the external page.

10. The method of displaying the page title on the terminal apparatus according to claim 9, wherein the second display area is a bookmark display area of a screen of the display section of the terminal apparatus.

11. The method of displaying the page title on the terminal apparatus according to claim 10, wherein the first display area is a page display area of the screen of the display section of the terminal apparatus.

12. The terminal apparatus according to claim 4, wherein the first title information is a page title of the external page, and the second title information is bookmark title information of the external page.

13. The terminal apparatus according to claim 12, wherein the second display area is a bookmark display area of a screen of the display section of the terminal apparatus.

14. The terminal apparatus according to claim 13, wherein the first display area is a page display area of the screen of the display section of the terminal apparatus.

15. A terminal apparatus, comprising:
first request signal transmission portion configured to transmit a request signal to request external page data relating to an external page;
first page data reception portion configured to receive said external page data corresponding to said request signal, said external page data including:
first title information,
second title information that is distinct from said first title information at a time of receiving the second title information, and
address information;
a storage portion configured to store said first title information, said second title information, and said address information of said external page data, said first title information including a plurality of characters that are not limited in number, and said second title information including a plurality of characters that are limited in number; and
a display portion configured to simultaneously display said stored first title information in a first display area and said stored second title information in a second display area that is smaller in size than the first display area,
wherein the number of characters of said second title information corresponds to the size of the second display area of said display portion.

* * * * *